United States Patent
Jung et al.

(10) Patent No.: US 8,597,723 B1
(45) Date of Patent: Dec. 3, 2013

(54) PERPENDICULAR MAGNETIC RECORDING MEDIUM WITH SINGLE DOMAIN EXCHANGE-COUPLED SOFT MAGNETIC UNDERLAYER AND DEVICE INCORPORATING SAME

(75) Inventors: Hong-Sik Jung, Pleasanton, CA (US); Emur M. Velu, Fremont, CA (US); Sudhir S. Malhotra, Fremont, CA (US); Jackie Tsoi Jung, Cupertino, CA (US); Gerardo A. Bertero, Redwood City, CA (US)

(73) Assignee: WD Media, LLC, San Jose, CA (US)

( * ) Notice: Subject to any disclaimer, the term of this patent is extended or adjusted under 35 U.S.C. 154(b) by 171 days.

(21) Appl. No.: 12/987,975

(22) Filed: Jan. 10, 2011

Related U.S. Application Data

(62) Division of application No. 12/049,206, filed on Mar. 14, 2008, now abandoned.

(51) Int. Cl.
*G11B 5/64* (2006.01)

(52) U.S. Cl.
USPC .......................................... 427/128; 427/127

(58) Field of Classification Search
USPC .................... 427/127, 128, 130, 131, 132; 428/828.1, 829, 611, 694
See application file for complete search history.

(56) References Cited

U.S. PATENT DOCUMENTS

| | | | |
|---|---|---|---|
| 5,815,342 A | 9/1998 | Akiyama et al. | |
| 6,280,813 B1 | 8/2001 | Carey et al. | |
| 6,548,194 B2 | 4/2003 | Hikosaka et al. | |
| 6,641,935 B1 * | 11/2003 | Li et al. | 428/828.1 |
| 6,645,614 B1 | 11/2003 | Girt et al. | |
| 6,660,357 B1 | 12/2003 | Litvinov et al. | |
| 6,686,070 B1 | 2/2004 | Futamoto et al. | |
| 6,723,457 B2 | 4/2004 | Tanahashi et al. | |
| 6,777,113 B2 | 8/2004 | Trindade et al. | |
| 6,818,330 B2 | 11/2004 | Shukh et al. | |
| 6,835,475 B2 | 12/2004 | Carey et al. | |
| 6,890,667 B1 | 5/2005 | Lairson et al. | |
| 6,893,748 B2 | 5/2005 | Bertero et al. | |
| 7,070,870 B2 | 7/2006 | Bertero et al. | |
| 7,105,239 B2 | 9/2006 | Oikawa et al. | |
| 7,106,539 B2 | 9/2006 | Aoyagi et al. | |
| 7,144,641 B2 | 12/2006 | Kawano et al. | |
| 7,147,941 B2 | 12/2006 | Futamoto et al. | |
| 7,153,596 B2 | 12/2006 | Tanahashi et al. | |
| 7,166,375 B2 | 1/2007 | Shimizu et al. | |
| 7,175,925 B2 | 2/2007 | Chen et al. | |

(Continued)

OTHER PUBLICATIONS

Jung et al., "High-Moment FeCo-IrMn Exchange-Coupled Soft Underlayers for Perpendicular Media", IEEE Transactions on Magnetics, Mar. 2003, pp. 679-684, vol. 39, No. 2.

(Continued)

*Primary Examiner* — Michael Cleveland
*Assistant Examiner* — Tabassom Tadayyon Eslami

(57) ABSTRACT

A perpendicular magnetic recording disk having a single domain exchange-coupled laminated soft magnetic underlayer (SUL) is disclosed. The SUL is a combination synthetic anti-parallel coupled SUL structure, which has the product (Mst) of saturation magnetization and film thickness of the middle ferromagnetic layer less than the sum of the Mst of the bottom and top ferromagnetic layers. Subjected to a post radial field reset process, this SUL provides single domain state. Moreover, both robustness of stray fields and low permeability are obtained while keeping excellent corrosion resistance and cost effective manufacturability.

9 Claims, 12 Drawing Sheets

(56) References Cited

U.S. PATENT DOCUMENTS

| | | | |
|---|---|---|---|
| 7,217,467 | B2 | 5/2007 | Arai et al. |
| 7,241,516 | B1 | 7/2007 | Acharya et al. |
| 2002/0197514 | A1 | 12/2002 | Tanahashi et al. |
| 2004/0137278 | A1* | 7/2004 | Uwazumi et al. ...... 428/694 TM |
| 2004/0234818 | A1 | 11/2004 | Tanahashi et al. |
| 2005/0129985 | A1* | 6/2005 | Oh et al. ................. 428/694 TS |
| 2005/0244679 | A1 | 11/2005 | Arai et al. |
| 2006/0057428 | A1 | 3/2006 | Akagi et al. |
| 2006/0146445 | A1 | 7/2006 | Nolan et al. |
| 2006/0147758 | A1 | 7/2006 | Jung et al. |
| 2006/0275628 | A1 | 12/2006 | Chen et al. |
| 2006/0286412 | A1* | 12/2006 | Jung ............................. 428/826 |
| 2007/0065681 | A1 | 3/2007 | Girt et al. |
| 2007/0212574 | A1 | 9/2007 | Berger et al. |
| 2007/0212575 | A1 | 9/2007 | Lee et al. |

OTHER PUBLICATIONS

Acharya et al., "Anti-Parallel Coupled Soft Under Layers for High Density Perpendicular Recording", IEEE Transactions on Magnetics, Jul. 2004, pp. 2383-2385, vol. 40, No. 4.

Hashimoto et al., "Fe Content Dependence of Synthetic-Antiferromagnetic Coupling in Subnano-Crystalline FeCoB/Ru/FeCoB Films", IEEE Transactions on Magnetics, Oct. 2006, pp. 2342-2344, vol. 42, No. 10.

Zhou et al., "Exchange-coupling-strength effect on the noise from soft magnetic underlayer", Journal of Applied Physics, May 2005, vol. 97, 10N114.

Ando et al., "Triple-Layer Perpendicular Recording Media for High SN Ratio and Signal Stability", IEEE Transactions on Magnetics, vol. 33, No. 5, pp. 2983-2985, Sep. 1997.

Takenoiri et al., "Exchange-Coupled IrMn/CoZrNb Soft Underlayers for Perpendicular Recording Media", IEEE Transactions on Magnetics, vol. 38, No. 5, pp. 1991-1993, Sep. 2002.

Byeon et al., "Synthetic Antiferromagnetic Soft Underlayers for Perpendicular Recording Media", IEEE Transactions on Magnetics, vol. 40, No. 4, pp. 2386-2388, Jul. 2004.

Victora et al., "Composite Media for Perpendicular Magnetic Recording", IEEE Transactions on Magnetics, vol. 41, No. 2, pp. 537-542, Feb. 2005.

Suess et al., "Optimization of Exchange Spring Perpendicular Recording Media", IEEE Transactions on Magnetics, vol. 41, No. 10, pp. 3166-3168, Oct. 2005.

Tanahashi et al, "Exchange-biased CoTaZr soft underlayer for perpendicular recording", Journal of Applied Physics, vol. 93, No. 10, pp. 8161-8163, May 2003.

D. Suess, "Multilayer Exchange Spring Media for Magnetic Recording", Applied Physics Letters, vol. 89, 113105, pp. 1-14, Sep. 2006.

* cited by examiner

PERPENDICULAR MAGNETIC RECORDING MEDIUM WITH SINGLE DOMAIN EXCHANGE-COUPLED SOFT MAGNETIC UNDERLAYER AND DEVICE INCORPORATING SAME This application is a divisional of U.S. patent application Ser. No. 12/049,206, filed Mar. 14, 2008 now abandoned, the disclosure of which is incorporated herein in its entirety by reference.

BACKGROUND OF THE INVENTION

The present invention is generally related to the field of magnetic disk recording, and more specifically to perpendicular magnetic recording media having a single domain exchange-coupled laminated soft magnetic underlayer.

Perpendicular magnetic recording is a form of magnetic recording in which bits of information are stored in a direction that is perpendicular to the plane of the recording media, which is typically a rotating disk forming part of a disk drive. To obtain this orientation of the bit magnetization, the anisotropy constant of the magnetic recording layer is configured such that its "easy" magnetic axis is perpendicular to the plane of the media. The magnetization establishing each bit is imparted by a write head. The layer in which the bits are formed is typically a magnetically "hard" recording layer. ("Hardness" and "softness" in this context refers to the ability for producing saturation in a magnetic layer with increasing external magnetic fields. A soft layer can produce magnetic saturation significantly faster than a hard layer.) In order to provide an appropriate closed loop for the field created by the write head when writing each bit, the hard recording layer is usually formed atop a "soft" magnetic underlayer ("SUL"). While the role of the recording layer is to carry the individual bits of recorded data, the role of the SUL is to guide the magnetic write field flux perpendicularly through the recording layer and then through the SUL in a return path to the write head. Thus, radial magnetic orientation of an SUL is needed for improving magnetic flux return efficiency. The radial orientation of the SUL depends on relative values of the anisotropy constant field of the SUL material used, and the applied radial field strength during film deposition. In order to induce radial magnetic anisotropy, radial field strength is typically maintained greater than the anisotropy constant field of the SUL material. Furthermore, uniform radial magnetic field distribution along the radial direction during film formation is needed.

As formed, a soft magnetic film is generally comprised of multiple groups of dipoles. Within each group, those dipoles couple together in a preferential direction. Groups of dipoles with a common or net preferred direction are referred to as magnetic domains. Such multiple domains may arise from magnetic charge accumulation at the inner and outer edges of the disk. These magnetic charges create a demagnetizing field, which in turn generates edge domains and 180° domains when a demagnetizing field is greater than the coercivity of the SUL. It is well known that multiple magnetic domains within such media (e.g., within the SUL) lead to media noise. For example, recorded data is detected as transitions from a region having one magnetic orientation to a region having an opposite magnetic orientation. Boundaries between magnetic domains in the SUL include out-of-plane magnetization components. These magnitudes are significantly high compared to the signal of the magnetic recording layer. Thus, they are read as erroneous data, called spike noise. Thus, it is desirable to provide a magnetic recording media structure with minimal magnetic domains, ideally 1.

One such example of a multi-tiered SUL teaches a laminated structure including as-deposited ferromagnetic and anti-ferromagnetic materials. See U.S. Pat. No. 6,723,457, incorporated herein by reference. Unidirectional uncompensated spins of the anti-ferromagnetic materials are induced along the magnetization direction of SUL during film deposition or a post magnetic field annealing process. The single domain state of the SUL is achieved by an exchange coupling with the anti-ferromagnetic pinning layer and it is also independent of stray magnetic fields. However, anti-ferromagnetic material (e.g., IrMn, PtMn, etc.) with reasonable blocking temperature at which exchange bias field strength ($H_{ex}$), defined as a horizontal loop shift of the magnetization-magnetic field (M-H) loop, becomes zero has historically been quite expensive, and tends to exhibit poor corrosion resistance because of the cost of Mn. Corrosion resistance has also proven difficult to obtain in such structures. Additionally, a magnetic field annealing process at 250-300° C. above a blocking temperature of anti-ferromagnetic material used is needed for better alignment of uncompensated spins on the surface of the anti-ferromagnetic material, which further reduces media noise.

To address the shortcomings of as-deposited ferromagnetic/anti-ferromagnetic laminates, SUL structures with evenly balanced anti-parallel ferromagnetic layers are currently being used in mass production. A synthetic anti-parallel (SAP) SUL laminate consists of two individual ferromagnetic layers sandwiching an Ru layer of a correct thickness (on the order of 6-8 Å). In remanence, these layers remain magnetically anti-parallel, which results in perfect cancellation of magnetization. This configuration becomes magnetostatically stable, resulting in decreasing magnetic charges along the edge of a disk. Thereby it significantly reduces the number of magnetic domains compared to single ferromagnetic SUL. However, magnetic domains still remain. In SUL structures with evenly balanced anti-parallel ferromagnetic layers, magnetic switching priority depends on Zeeman energy (the energy of interaction between an atomic or molecular magnetic moment and an applied magnetic field) on each film, which for the purposes hereof may be given by $Mr \times H_e \times V$ at a zero external field, where Mr is the remanent magnetization, $H_c$ is the coercivity, and V is the volume of each layer of the SUL. Under the assumption of the same value of $H_c$ on each soft ferromagnetic layer, Zeeman energy is proportional to film thickness (t) when one SUL material is used but it is proportional to Mrt (the product of Mr and the film thickness t) of each layer when different SUL materials are used. Soft ferromagnetic layers typically have low coercivity of less than 10 Oe and a high squareness ratio, with Ms≈Mr, where Ms is the saturation magnetization. Generally, the layer with lower Mst in synthetic anti-parallel (SAP) SULs has a higher magnetic switching priority than the layer with higher Mst assuming each has the same coercivity. Thus, such balanced SAP SULs cannot maintain a single domain state following removal of the magnetic field used in manufacturing due to the identical magnetic switching priority of the bottom and top ferromagnetic layers. Furthermore, low exchange coupling strength is observed when amorphous Co-based alloys are used. In order to improve exchange coupling strength, using CoFe-based alloys with high saturation magnetization is preferred but it deteriorates corrosion resistance.

In order to provide magnetic switching priority, SAP SULs with un-balanced Zeeman energy have been discussed in B. R. Acharya, et al., Anti-Parallel Coupled Soft Under Layers for High-Density Perpendicular Recording, IEEE Transactions on Magnetics, Vol. 40, No. 4, 2383, July 2004, incorporated herein by reference. Typically, a structure using two soft ferromagnetic layers sandwiching a Ru layer uses a thinner top ferromagnetic layer compared to the bottom ferromagnetic layer on top of NiP-plated substrate or adhesion layer when one soft magnetic material is used. The thinner top layer also provides higher exchange bias field strength for improving adjacent track erasure (ATE). A similar concept was used for a tri-layer SUL in U.S. Pat. No. 7,241,516, incorporated herein by reference, with first ferromagnetic layer thickness greater than second and third ferromagnetic layer thicknesses. The first and second soft ferromagnetic layers separated by a thin amorphous Ta layer ferromagnetically couple each other. The second and third ferromagnetic layers separated by a thin Ru layer anti-parallel couple. However, the first ferromagnetic layer with relatively thicker film thickness typically exhibits low coercivity of less than 10 Oe, which depends on both the kinds of soft magnetic materials and process conditions to be used. Magnetic domain states are controlled by coercivity in the first thicker ferromagnetic layer and stray field strength. Media with un-balanced SAP SULs demonstrate weak stray field robustness and magnetic domains are easily induced when external stray fields are higher than the $H_c$ value in the first thicker ferromagnetic layer. Efforts have been made to develop pinning layers with anti-ferromagnetic layers, as discussed in U.S. Pat. No. 6,723,457, but such efforts have been unsatisfactory to date.

Another SUL structure with three soft ferromagnetic layers and two Ru coupling layers to induce anti-parallel exchange coupling between ferromagnetic layers is discussed in U.S. Pat. No. 7,166,375, incorporated herein by reference. This tri-layer SUL structure consisting of two soft magnetic materials of $CoZr_4Nb_7$ and $FeAl_9Si_5$ can increase exchange coupling strength of $H_{ex}$ and saturation field ($H_s$), defined as a field needed to saturate magnetization up to 95%, due to the contribution of two Ru layers. However, it does not consider magnetization cancellation: The product of saturation flux density (4 Ms) and film thickness (t) on each layer in the tri-layer SUL has the same value of 40 T nm, where the T unit means Tesla (1 T=10 kiloGauss (kG)). Degree of magnetic cancellation between ferromagnetic layers and magnetic domain configuration can not be controlled in this tri-layer SUL due to lack of magnetic switching priority.

Accordingly, there has not been a satisfactory solution to the problems of noise resulting from multi domain SUL, ATE, robustness of stray fields, and corrosion resistance. Therefore, there is needed in the art an arrangement, and process for making same, which yields a magnetic recording disk with single domain, high exchange coupling strength, and corrosion resistance, while still providing other desirable media attributes such as manufacturability and operational performance and longevity.

SUMMARY OF THE INVENTION

Accordingly, the present invention is directed to a magnetic recording medium having a magnetic-domain free SUL while keeping excellent performance of ATE, robustness of stray fields, and corrosion resistance, a process for manufacturing same, and a device such as a disk drive in which said medium operates.

According to one aspect of the invention, a perpendicular magnetic recording medium is disclosed which includes a laminated SUL structure, the various soft layers of the lamination nearly offsetting one another in magnetic orientations. According to one embodiment when one soft magnetic material is used, the laminated SAP SUL structure is comprised of a first ferromagnetic layer ($FM_1$) of layer thickness t having a first magnetic orientation, a second ferromagnetic layer ($FM_2$) of layer thickness 2t-δ having a magnetic orientation anti-parallel to the first magnetic orientation, and a third ferromagnetic layer ($FM_3$) of layer thickness t having the first magnetic orientation. Between each ferromagnetic layer is a separation layer of Ru, which provides anti-parallel coupling between ferromagnetic layers. On the basis of switching priority driven by Zeeman energy, $FM_2$ switches first at a zero external field. Larger values of provide more driving force for magnetic switching, resulting in maximizing magnetostatic interactions between soft ferromagnetic layers. However, this unique structure itself cannot provide a single-domain state when a magnetron sputtering technique is used for film deposition. Radial magnetic fields from target cathodes are against the initially-set easy axis of the SUL along the radial direction during film deposition when a disk moves from the film deposition chamber to the subsequent chamber. Thus, an as-deposited SUL shows multiple domains. Other magnetic arrangements of cathodes also provide various magnetic fields affecting magnetic domain configurations on SUL during magnetron sputtering process.

It is known that a shielded-pole write head has more in-plane magnetic field components than a mono-pole writer head and it strongly interacts with the SUL. A SUL with higher SAP exchange coupling is needed for reduced magnetic interactions with the write head. According to the present invention, the use of two Ru layers to induce SAP exchange coupling easily makes values of exchange bias field strength and coercivity double, which provides excellent ATE improvement and robustness of stray fields. The enhanced SAP coupling also helps improve corrosion resistance in the SUL. SUL materials with low saturation flux density provide less interfacial exchange coupling energy. Higher saturation flux density is typically achieved by adding Fe into Co- or CoNi-based alloys but the addition of Fe deteriorates corrosion resistance. The enhanced exchange coupling strength in the invented SUL allows use of soft magnetic materials with lower saturation flux density while maintaining similar values of exchange coupling strength in high saturation flux density SUL.

According to one embodiment, each ferromagnetic layer is comprised of amorphous soft $CoTa_5Zr_5$ showing excellent corrosion resistance with coercivity <1 Oe along the easy axis and saturation flux density ~13 kG. However, other materials for each of the ferromagnetic and separation layers, as well as different compositions for each ferromagnetic or separation layer within a lamination, are contemplated by the present invention.

According to another aspect of the present invention, a method of manufacturing a perpendicular magnetic recording disk is disclosed in which a first soft ferromagnetic layer ($FM_1$) is deposited above a substrate. Second ($FM_2$) and third ($FM_3$) soft ferromagnetic layers are likewise deposited, with spacer layers deposited between each ferromagnetic layer. $FM_1$ and $FM_3$ layers are deposited to have $Ms_1t_1$ and $Ms_3t_3$, respectively. $Ms_1$ and $Ms_3$ are the saturation magnetization and $t_1$ and $t_3$ are film thickness of the $FM_1$ and $FM_3$ layers, respectively. The $FM_2$ layer is deposited to have $Ms_2t_2$, where $Ms_2$ and $t_2$ are the saturation magnetization and film thickness of the $FM_2$ layer, respectively. Total SUL Mst ($Mst_{total}$) is defined as $Ms_1t_1+Ms_2t_2+Ms_3t_3$. The difference in Mst between the $FM_1$ and $FM_3$ layers and the $FM_2$ layer, Mst is defined as $(Ms_1t_1+Ms_3t_3)-Ms_2t_2$, preferably $Ms_1t_1 \sim Ms_3t_3$. The reduction of Mst in the $FM_2$ layer depends on value of α (%), defined as $(Mst/[Ms_1t_1+Ms_3t_3])\cdot 100$, where $0<\alpha\leq 25\%$.

A higher value of increases the difference in Zeeman energy between the $FM_1$ and $FM_3$ layers and the $FM_2$ layer, which provides higher magnetic switching priority in the $FM_2$ layer. This also stabilizes anti-parallel magnetizations between the $FM_1$ and $FM_3$ layers and the $FM_2$ layer by increasing magnetostatic interactions.

According to another aspect of the present invention, after formation, the perpendicular magnetic recording media with a SUL according to the present invention are subjected to a radial magnetic field reset process. According to this aspect of the present invention, the recording media is exposed to a radially varying magnetic field gradient. This radial magnetic field reset process resets and aligns the magnetization of each ferromagnetic layer in the SUL. Radial magnetic field strength should be greater than the switching field of the SUL, $H_{ex}+(H_c/2)$, along the radial direction of the media, and preferably greater than $H_s$ along the circuital direction of the media. After radial field reset, the magnetization of each ferromagnetic layer realigns, which is driven by Zeeman energy and stabilized by magnetostatic interactions. $FM_2$ with lower Zeeman energy switches first while $FM_1$ and $FM_3$ maintain the same magnetization direction, resulting in a single domain state. Through the combination of the novel SUL structure and post radial magnetic field reset process a magnetic domain-free SUL is obtained.

According to still another embodiment of the present invention, a perpendicular magnetic data storage disk drive is disclosed which includes a perpendicular magnetic data storage disk selected from the types summarized above.

The above is a summary of a number of the unique aspects, features, and advantages of the present invention. However, this summary is not exhaustive. Thus, these and other aspects, features, and advantages of the present invention will become more apparent from the following detailed description and the appended drawings, when considered in light of the claims provided herein.

BRIEF DESCRIPTION OF THE DRAWINGS

In the drawings appended hereto like reference numerals denote like elements between the various drawings. While illustrative, the drawings are not drawn to scale. In the drawings.

DETAILED DESCRIPTION OF THE INVENTION

Figure 1:
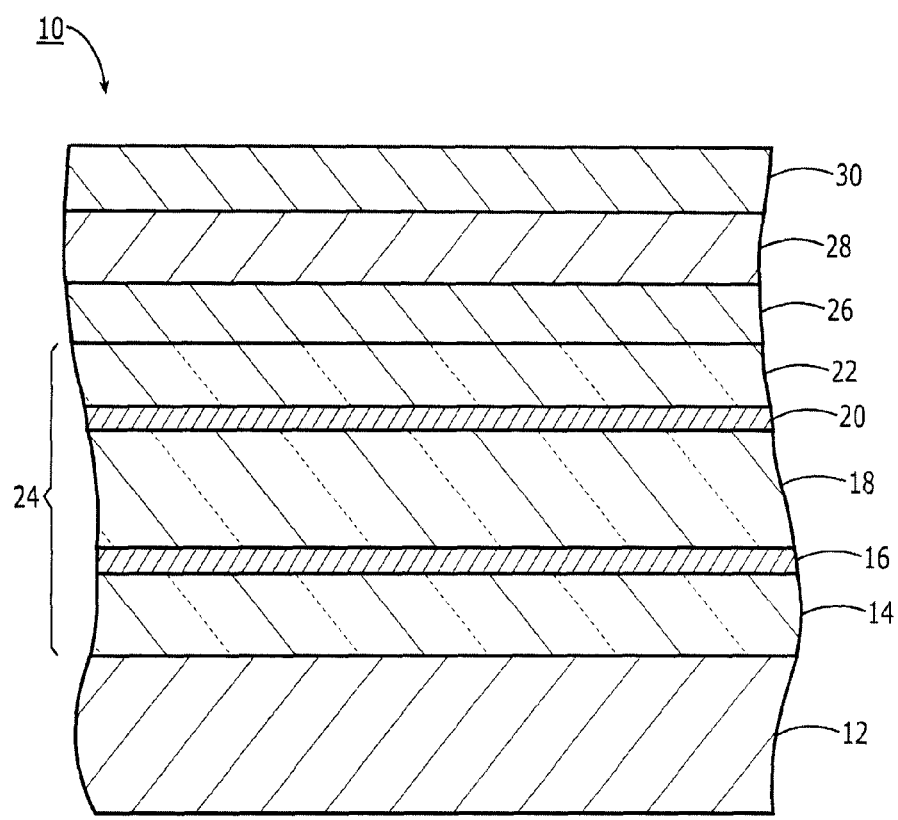
FIG. 1 is a cross-sectional illustration of a portion of a magnetic recording disk according to a first embodiment of the present invention.

FIG. 1 is a cross-sectional illustration of a portion of a magnetic recording disk 10 according to a first embodiment of the present invention. While the disk structure described immediately below has been found to provide many of the advantages of the present invention, variations on this structure, such as additional or alternate layers are contemplated by this disclosure, and according what follows is exemplary of a structure embodying the present invention. Disk 10 comprises a substrate 12, such as a metal (e.g., Al, AlMg, etc.), or glass (e.g., borosilicate, aluminosilicate, etc.). Substrate 12 may optionally be plated (e.g., with NiP, etc., and not show), and polished and/or textured. Formed over substrate 12 is a first soft ferromagnetic underlayer ($FM_1$) 14. A spacer layer 16 is formed over layer 14. A second soft ferromagnetic underlayer ($FM_2$) 18 is formed over layer 16. Spacer layer 20 is formed over layer 18. A third soft ferromagnetic underlayer ($FM_3$) 22 is formed over layer 20. Together, the layers 14-22 form soft underlayer (SUL) laminate 24.

Formed over laminate 24 is a nucleation layer 26, and formed over nucleation layer 26 is a magnetic recording layer 28. As well known, nucleation layer 26 provides desired c-axis crystallographic orientation and grain size for the magnetic recording layer 28. An overcoat 30 ultimately mechanically protects the completed structure. Typically, each side of the disk will be provided with an identical structure, in mirror-image across the substrate.

First soft ferromagnetic underlayer 14, second soft ferromagnetic underlayer 18, and third soft ferromagnetic underlayer 22 may each be comprised of the same material, such as an alloy of cobalt containing Co 30-95%, and one or more elements of Fe, Ni, Mn, Pd, Ta, Nb, Zr, Hf, Cr, Ti, Mo, V, W, Al, Si, B, N, and/or O. One exemplary alloy for first, second, and third SULs 14, 18, and 22 is an alloy of cobalt, tantalum, and zirconium (CoTaZr). Alternatively, the composition of these layers may vary as between them. Typically, the SUL materials will have a saturation flux density ≥8 kG. Saturation flux density values mostly depend on the relative composition ratio of Co, Ni, and Fe. Amounts of non-magnetic elements to be added into a given composition of soft ferromagnetic material control crystallinity of grains in an amorphous matrix and improve corrosion resistance but they will reduce the saturation flux density value. Generally, soft magnetic properties in ferromagnetic layers with small magnetostriction values are obtained in amorphous structured or nanocrystalline grains in an amorphous matrix. The top soft ferromagnetic layer can be used as part of a nucleation layer. Addition of Ni into Co-based alloy improves face-centered cubic (FCC) structure and enhances crystallinity of grains during film deposition. It is well known that reactive sputtering of Ar/($N_2$ or $O_2$) and/or adding non-magnetic elements of Si, B, Nb, etc. into CoNi-based alloy reduces both grain size and its crystallinity. In one embodiment, spacer layers 16 and 20 are each composed of ruthenium (Ru) or an alloy thereof. Alternatively, other materials such as Re and Cr which induce anti-parallel coupling between adjacent soft magnetic under layers 14, 18, 22 may be employed. Since the anti-parallel coupling is induced in the layers, as opposed to being an as-deposited attribute thereof, such a lamination is referred to as SAP structure. Spacer layers 16 and 20 may have a thickness in the range of 4 to 10 Å, and in one particular embodiment comprises 6-8 Å thick layers of Ru.

Magnetic recording layer 28 will be a "hard" magnetic material, and may be composed, for example, of Co-alloys, Co-oxide alloys, a Co/Pt based metallic layer or multi-layers, or may be based on intermetallic compounds. According to one embodiment, magnetic recording layer 28 is composed of dual layers of cobalt chrome platinum-based alloys: $CoCr_{17}Pt_{18}Si_4O_{12}$ for the bottom layer and $CoCr_{16}Pt_{18}B_4$ for the top layer. Alternatively, magnetic recording layer 28 may be composed of multiple magnetic recording layers and non-magnetic layers: triple magnetic recording layer media, exchange coupled composite (ECC) type media discussed in R. H. Victora and X. Shen, Composite media for perpendicular magnetic recording, IEEE Transactions on Magnetics, Vol. 41, No. 2, 537, February 2005, or exchange spring (ES) type media with various magnetic anisotropy constants discussed in D. Suess et al., Optimization of exchange spring perpendicular recording media, IEEE Transactions on Magnetics, Vol. 41, No. 10, 3166, October 2005 and D. Suess, Multilayer exchange spring media for magnetic recording, Applied Physics Letters, Vol. 89, 113105, September 2006, each being incorporated herein by reference.

Figure 2:
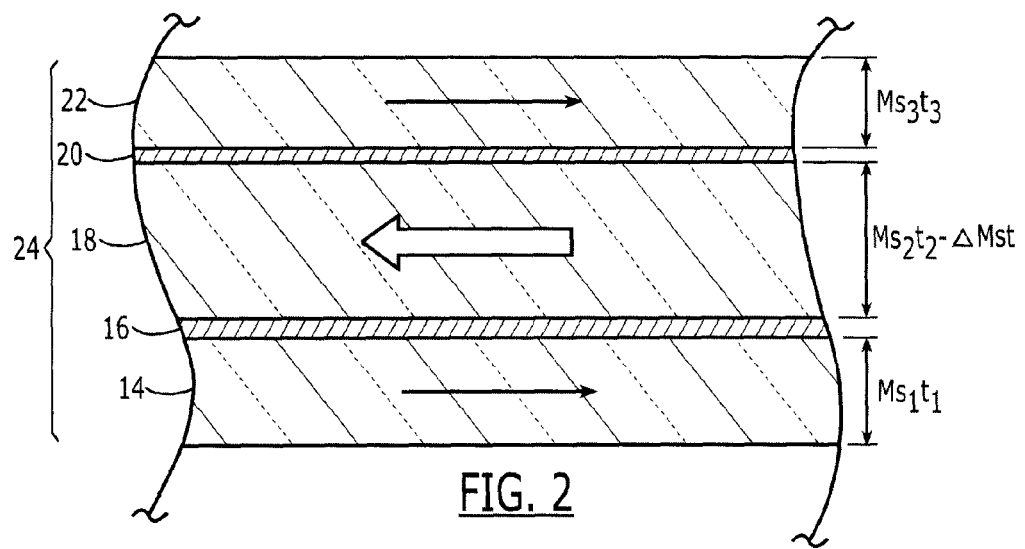
FIG. 2 is a cross-sectional illustration of a soft ferromagnetic layered lamination forming a portion of the magnetic record disk illustrated in FIG. 1.

Accordingly, with reference to the embodiment of FIG. 2, layers 14, 18, and 22 are formed of the same soft ferromagnetic material. Layer 14 is formed to a thickness t, where, for example, $6 \leq t \leq 30$ nm, preferably $10 \leq t \leq 20$ nm. Layer 22 is also formed to thickness t. Ultimately, layers 14 and 22 will assume a parallel magnetic orientation. Layers 16 and 20 are a spacer layer of Ru to provide SAP exchange coupling between layers 14, 18, and 22. Layer 18, however, will ultimately assume an anti-parallel magnetic orientation, and is formed to a thickness $2t-\delta$, where, for example, $0 < \alpha \leq 25\%$, and $\alpha (\%) = (\delta/2t) \times 100$. That is, layer 18 is formed to have a thickness which is less that the combined thicknesses of layers 14 and 22. However, layers 14, 18, and 22 can be formed of more than one soft ferromagnetic material. Layers 14 and 22 are deposited to have $Ms_1t_1$ and $Ms_3t_3$, respectively. $Ms_1t_1$ and $Ms_3t_3$ are the product of the respective saturation magnetization, $Ms_1$ and $Ms_3$, and film thickness, $t_1$ and $t_3$, of layers 14 and 22. Layer 18 is deposited to have $Ms_2t_2$, where $Ms_2t_2$ is the product of the saturation magnetization, $Ms_2$, and film thickness, $t_2$, of layer 18. Total SUL Mst ($Mst_{total}$) is defined as $Ms_1t_1+Ms_2t_2+Ms_3t_3$ in the range of 2.0 to 12.4 memu/cm$^2$, preferably $4.0 \leq Mst_{total} \leq 8.3$ memu/cm$^2$. The difference in Mst between layers 14 and 22 and layer 18, Mst is defined as $Mst=(Ms_1t_1+Ms_3t_3)-Ms_2t_2$, where preferably $Ms_1t_1 \sim Ms_3t_3$. The reduction of Mst in layer 18 depends on a value $\alpha$ (%), defined as $\alpha=(Mst/[Ms_1t_1+Ms_3t_3])\cdot100$, where $0 < \alpha \leq 25\%$. Increasing value provides higher magnetic switching priority in layer 18. Magnetostatic interactions betweens layers 14, 18, and 22 stabilize anti-parallel magnetizations. If one SUL material is used, the relationship can be simplified. When $t_1$ and $t_3$ have same thickness t, layer 18 has a thickness of approximately $2t-\delta$, where t is in the range of 6 to 30 nm, and $0 < \alpha \leq 25\%$, where $\alpha (\%) = (\delta/2t) \cdot 100$.

Figure 3:
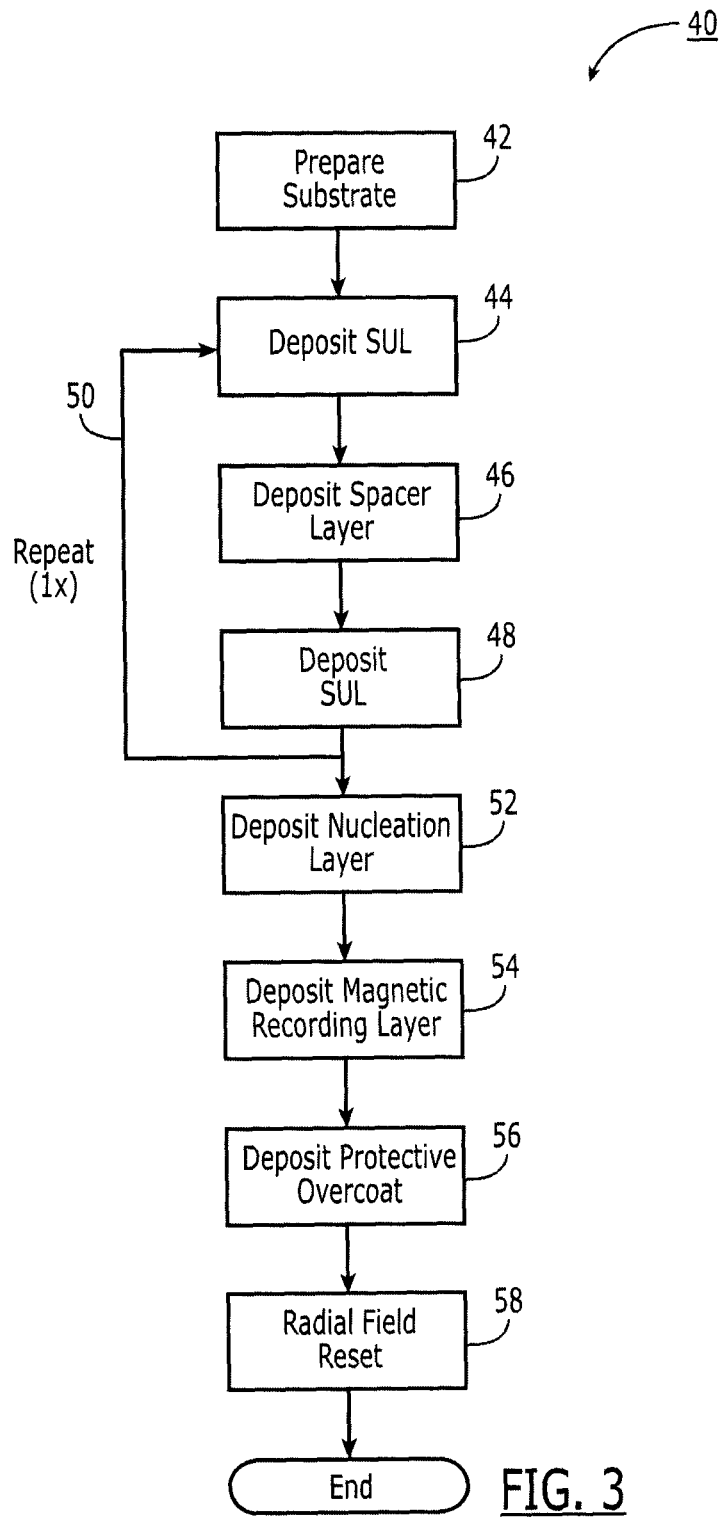
FIG. 3 is an illustration of a method of manufacturing perpendicular magnetic recording media according to the present invention.

With reference now to FIG. 3, one embodiment 40 of a method of manufacturing perpendicular magnetic recording media according to the present invention is shown. Initially, a substrate is prepared in step 42. The generation of a substrate for a magnetic recording disk is known in the art; accordingly a detailed discussion is not provided. In one embodiment, the substrate may be plated (e.g., with NiP) and may also be polished and/or textured prior to subsequent deposition of layers. In step 44, a first soft magnetic underlayer is deposited (directly or indirectly) above the substrate. A spacer layer (e.g., Ru) is next deposited above the soft magnetic underlayer in step 46, followed by deposition of another soft magnetic layer in step 48. Steps 46 and 48 are repeated at 50 to generate the second spacer later and third soft magnetic layer, as discussed above, completing the laminated SUL. It will be noted that each step of depositing an SUL and an underlayer is individually controlled to obtain a desired thickness for that individual SUL and spacer layer. That is, each layer is formed to have its own appropriate thickness. In addition, while each of the SULs in the present embodiment have a common composition (as does each spacer layer), the composition of each of said layers may be individually controlled at its respective deposition step.

In one embodiment, a nucleation layer is then deposited above the laminated SUL in step 52. A magnetic recording layer is next deposited above the nucleation layer or, alternatively, if no nucleation layer is present, above the laminated SUL structure in step 54. A protective overcoat may then be deposited over the magnetic recording layer in step 56. Additional layers may also be deposited in the structure as will be appreciated by one skilled in the art.

Deposition of the spacer layer(s), the soft magnetic underlayers, the nucleation layer, the magnetic recording layer, and the protection layer above the substrate can be accomplished by a variety of methods known in the art, such as, for examples, sputtering, chemical vapor deposition (CVD), ion-beam deposition (IBD), etc.

Following completion of the physical manufacture, the perpendicular magnetic recording media is exposed to a radial field reset in step 58. This is accomplished by subjecting the media to a radially varying magnetic field. An apparatus for accomplishing this radial field reset may be a typical or modified sputtering gun for an individual disk after film deposition of protective overcoat or specialized device for a whole cassette containing a plurality (e.g., 25) disks as discussed in U.S. Patent Application 2006/0286412 A1, which is incorporated herein by reference. In order to reset magnetic orientation in a SAP SUL, media should be subjected to a radial magnetic field of strength greater than the switching field of the SAP SUL, $H_{ex}+(H_c/2)$, along the radial direction of the media, and preferably greater than saturation field along a circuital direction of the media. A typical sputtering gun for SUL deposition generates radial magnetic fields from 60 to 120 Oe, a sufficient field strength to initially set radial magnetic anisotropy of the soft ferromagnetic layer itself, but which may not be a sufficient field strength to saturate a SAP SUL during post radial field reset process. Modifying a sputtering TM gun (e.g., with a high magnetization soft magnetic rod) can easily produce radial field strength from 0.5 to 1.2 kOe depending on applied current, which is sufficient field strength to saturate magnetization in the SAP SUL. The radial field reset process is done at room temperature for more than 1 sec, preferably 2-4 sec. Longer exposure time does not affect radial orientation in the SAP SUL. In FIG. 2, layer 18 with $Ms_2t_2$ less than the sum of $Ms_1t_1$ and $Ms_3t_3$ switches first when radial field strength decreases to zero, producing an anti-parallel magnetic orientation compared to radial magnetic orientation in layers 14 and 22. Accordingly, perpendicular magnetic recording media with single domain SAP SUL are thereby produced.

Figure 4:
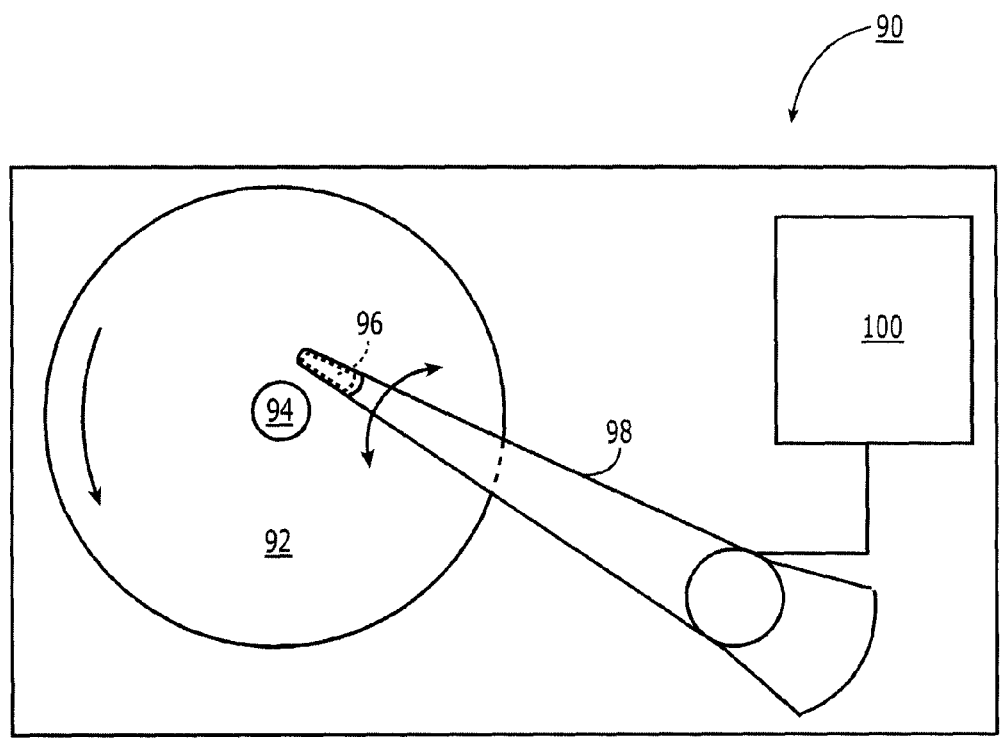
FIG. 4 illustrates a perpendicular magnetic data storage disk drive including a perpendicular magnetic data storage disk according to an embodiment of the present invention.

Media manufactured according to the above processes ultimately enable manufacture of an improved data storage device, with improved longevity, higher capacity, improved data writing and retrieving performance, and lower cost. FIG. 4 illustrates a disk drive 90 including disk 92 of the type described immediately above. Disk drive 90 may include one or more such disks 92 to store data. Disk 92 is secured to a rotating spindle assembly 94 that is mounted to spindle motor (not shown). Data may be stored along tracks in the magnetic recording layer of disk 92. The reading and writing of data is accomplished with head 96, which includes both read and write elements, the motion of which relative to disk 92 is controlled by a motor driven arm 98. In one embodiment, head 96 may have a magneto-resistive (MR), in particular, a giant magneto-resistive (GMR) or tunneling magneto-resistive (TMR) read element, and an inductive mono-pole or shielded-pole write element. In an alternative embodiment, head 96 may be another type of head, for example, an inductive read/write head or a Hall-effect head. The spindle motor (not shown) rotates disk 92 to position head 96 at a particular location along a desired disk track. The position of head 96 relative to disk 92 may be controlled by position control circuitry 100. The use of disk 92 fabricated in the manner discussed above may render the perpendicular magnetic recording layer of disk 92 less prone to noise from the soft magnetic underlayers. The soft magnetic underlayers operate to minimize the effects of underlayer domain transitions in the reader of head 96. Accordingly, an improved magnetic disk drive is thereby provided.

Figure 5A:
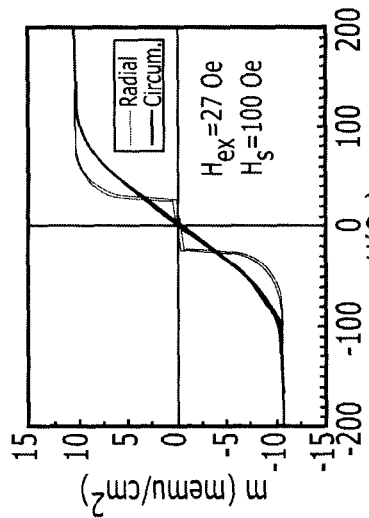
FIGS. 5a-d are comparisons of the hysteresis loops in varying layers and structures, including prior art and structures according to the present invention.

We have evaluated perpendicular magnetic recording media of the type described above for several key performance attributes. With reference now to FIGS. 5a-d, a comparison of various structures and media coercivity is illustrated. FIG. 5a is a hysteresis loop for a perpendicular magnetic recording medium having a single $CoTa_5Zr_5$ soft underlayer of thickness 108 nm. This medium has a very low coercivity of <1 Oe in the radial direction, and a low induced magnetic anisotropy field ($H_k$) of 20 Oe in the circuital direction.

Figure 5B:
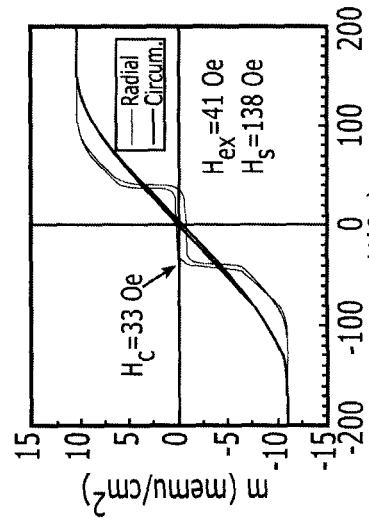

FIG. 5b is a hysteresis loop for a laminated SUL structure comprised of two ant-parallel ferromagnetic layers with a Ru spacer layer therebetween. As can be seen, a horizontal shift in the hysteresis loop is introduced with the introduction of the anti-ferromagnetic coupling between the two ferromagnetic layers. This step occurs at $H_{ex}=27$ Oe. This step is significant in that in the absence of an applied magnetic field, the orientation of the magnetic field of the SUL lamination remains oriented. This is an aspect of the desirable property leading to robustness of stray fields for the media. In addition, this medium exhibits a relative higher saturation field, $H_s$, of 100 Oe along the circuital direction.

Figure 5C:
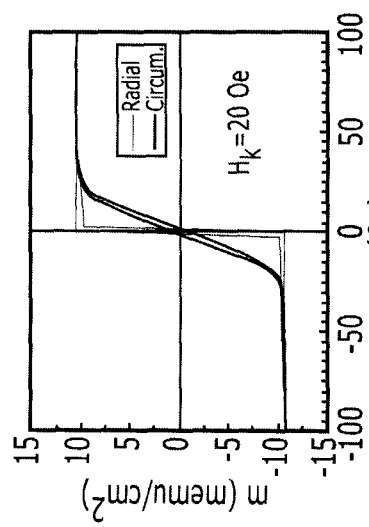

FIG. 5c is a hysteresis loop for a laminated SUL structure in which the laminated SUL comprises a first ferromagnetic layer of 27 nm thick $CoTa_5Zr_5$, a first 0.8 nm thick Ru spacing layer, a 54 nm thick second ferromagnetic layer of $CoTa_5Zr_5$, a second 0.8 nm thick Ru spacing layer, and finally a 27 nm thick third ferromagnetic layer of $CoTa_5Zr_5$. That is, the sum of the thicknesses of the first and third ferromagnetic layers equals the thickness of the second ferromagnetic layer, which provides equivalent magnetic switching priority. This condition leads to statistically multiple remanent magnetic domain states, as further discussed below. As can be seen, the shift in the hysteresis loop due to SAP is more pronounced as compared to that of FIG. 8b. The exchange coupling field $H_{ex}=39$ Oe, and the saturation field $H_s=144$ Oe. Each of these measurements represents a desirable improvement over the dual SUL structure of FIG. 8b.

Figure 5D:
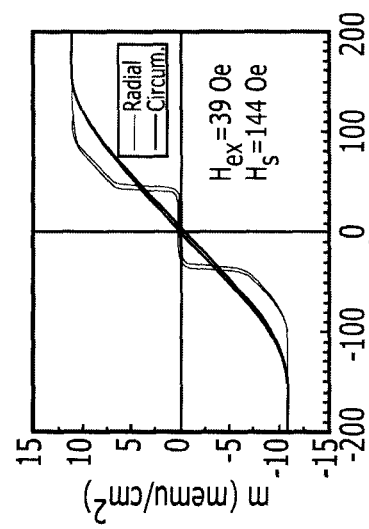

FIG. 5d is a hysteresis loop for a laminated SUL structure corresponding to the first embodiment described above. The laminated SUL comprises a first ferromagnetic layer of 27 nm thick $CoTa_5Zr_5$, a first 0.8 nm thick Ru spacing layer, a 51 nm thick second ferromagnetic layer of $CoTa_5Zr_5$, a second 0.8 nm thick Ru spacing layer, and finally a 27 nm thick third ferromagnetic layer of $CoTa_5Zr_5$. That is, the sum of the thicknesses of the first and third ferromagnetic layers exceed the thickness of the second SUL by an amount δ, where δ=2(27)−51=3 nm. A single magnetic domain state can be anticipated in this structure because of magnetic switching priority in the second $CoTa_5Zr_5$ layer. The exchange coupling field $H_{ex}=41$ Oe, and the saturation field $H_s=138$ Oe are comparable to the values of FIG. 5c. The unique structure provides a high coercivity of 33 Oe, due to enhancement of magnetostatic exchange coupling caused by the second layer thickness thinner than the thicknesses of the first and third layers. This high coercivity provides robustness of stray fields. Each of these measurements represents a desirable improvement over the dual SUL structure of FIG. 5b.

Figure 6:
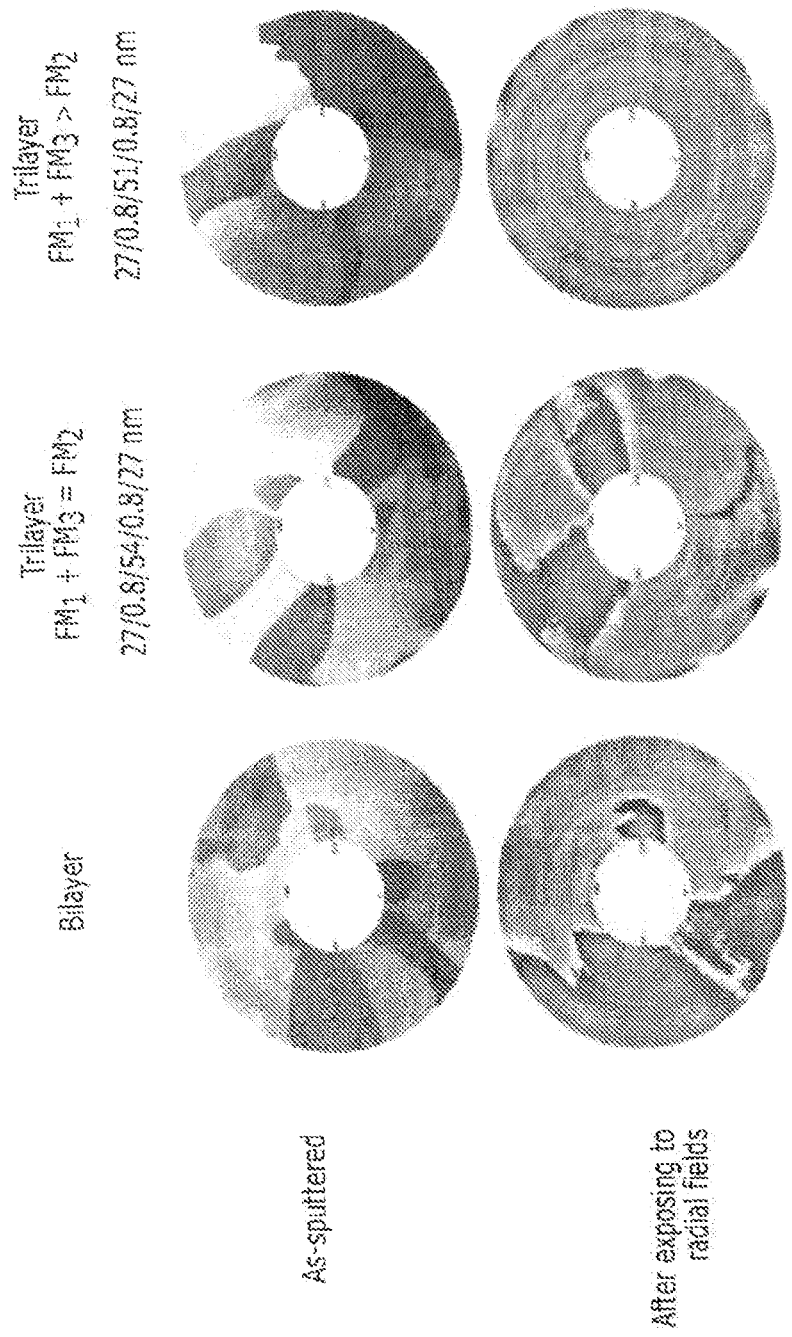
FIG. 6 is an illustration of magnetic domains characterized by an optical surface analyzer (OSA) with Kerr detection, for the SUL detailed in FIGS. 5 b-d.

As-sputtered and radial field reset magnetic domain states for the SUL structures discussed above with regard to FIGS. 5b-5d are shown in FIG. 6. Contrasting dark and light regions indicate regions of differing magnetic orientation. Thus, transitions between light and dark regions represent domain boundaries. As expected, the SUL structures in FIGS. 5b and 5c with equivalent Zeeman energy exhibit a number of domains in the as-sputtered state. The post-radial field reset process modifies only the locations of magnetic domains. However, FIG. 5d clearly shows the difference in magnetic domains between as-sputtered and post-radial field reset. In the as-sputtered state, this structure is capable of exhibiting a single domain, but the disk typically exhibits magnetic domains due to exposure to opposite radial fields from the magnetic backpack of the cathode when the disk is removed from the chamber after finishing sputtering. A single domain state is successfully achieved on the structure after post-radial field reset. This result demonstrates that the combination of the SUL structure with post-radial field reset process according to the present invention can achieve single domain state on SAP SUL.

Figure 7B:
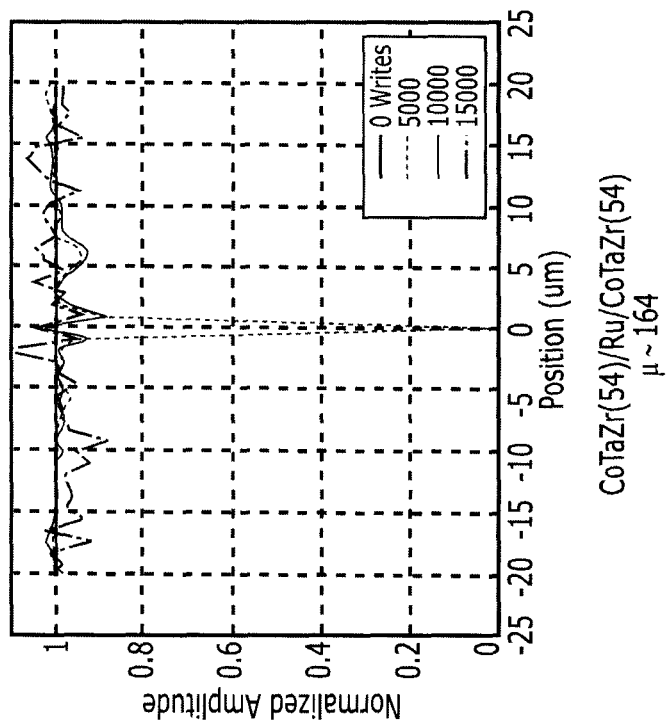
FIGS. 7a-c are illustrations of adjacent track erasure (ATE) performance for perpendicular magnetic recording media with various SUL structures, according to an embodiment of the present invention.
Figure 7A:
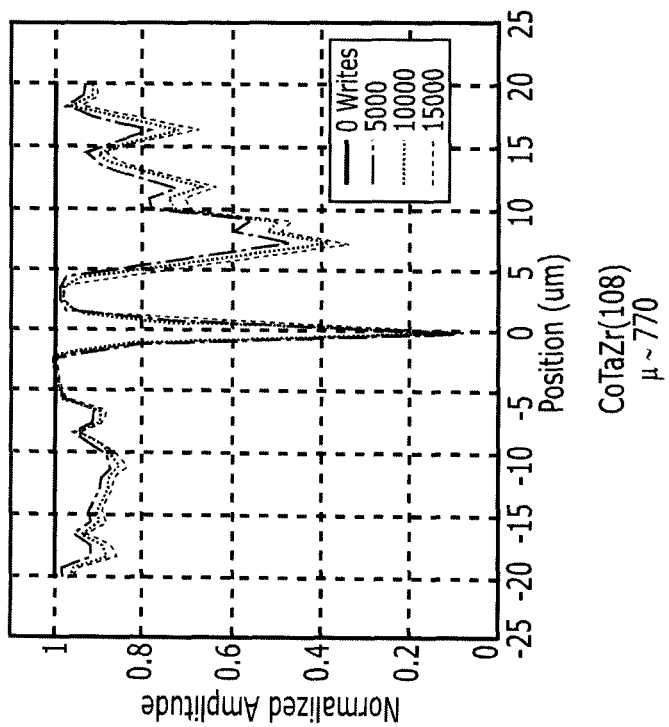
Figure 7C:
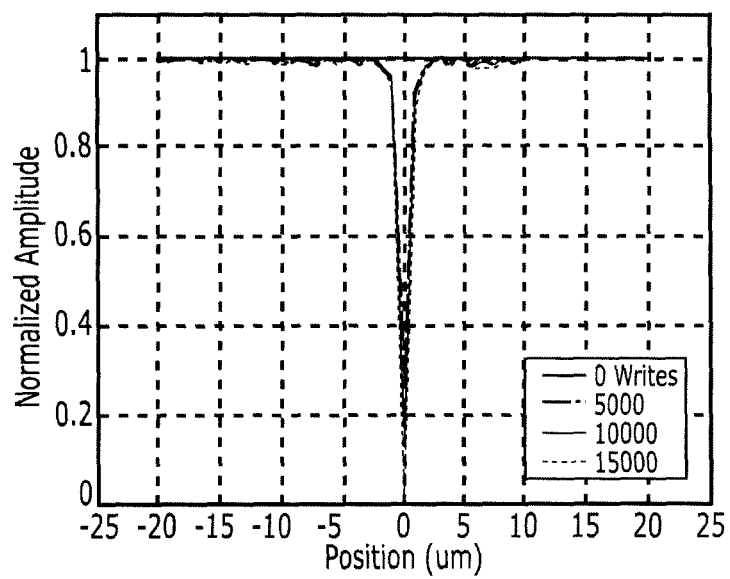

Referring next to FIGS. 7a-7c, the adjacent track erasure (ATE) performance of perpendicular magnetic recording media with various SUL structures is examined. FIG. 7a illustrates the ATE for a medium in which a single SUL in FIG. 5a is disposed below the magnetic recording layer. Permeability, μ, for this single SUL was measured at approximately 770. As can be seen, a written track has a strong and undesirable impact on its adjacent track. The asymmetric ATE is caused by skew of the head. While high permeability of the SUL enhances magnetic flux return, it simultaneously increases media noise and ATE. It is known that permeability for acceptable ATE performance is generally below 200 depending on the types of write heads. From FIG. 7b we see that forming a laminated bi-layer SUL structure with Ru as the spacer layer in FIG. 5b to impart SAP significantly improves ATE performance. Permeability for this bilayer SUL was measured as approximately 164. The data illustrated in FIG. 7c is from a magnetic recording medium having the laminated SUL structure in FIG. 5d described with regard to FIG. 2, above. As can be seen, the ATE is further improved, which is supported by the low permeability of 62 measured for this media. From this we conclude that the tri-layer laminated SUL structure of the present invention provides significantly reduced permeability and improved ATE performance when compared to known media structures.

Figure 8:
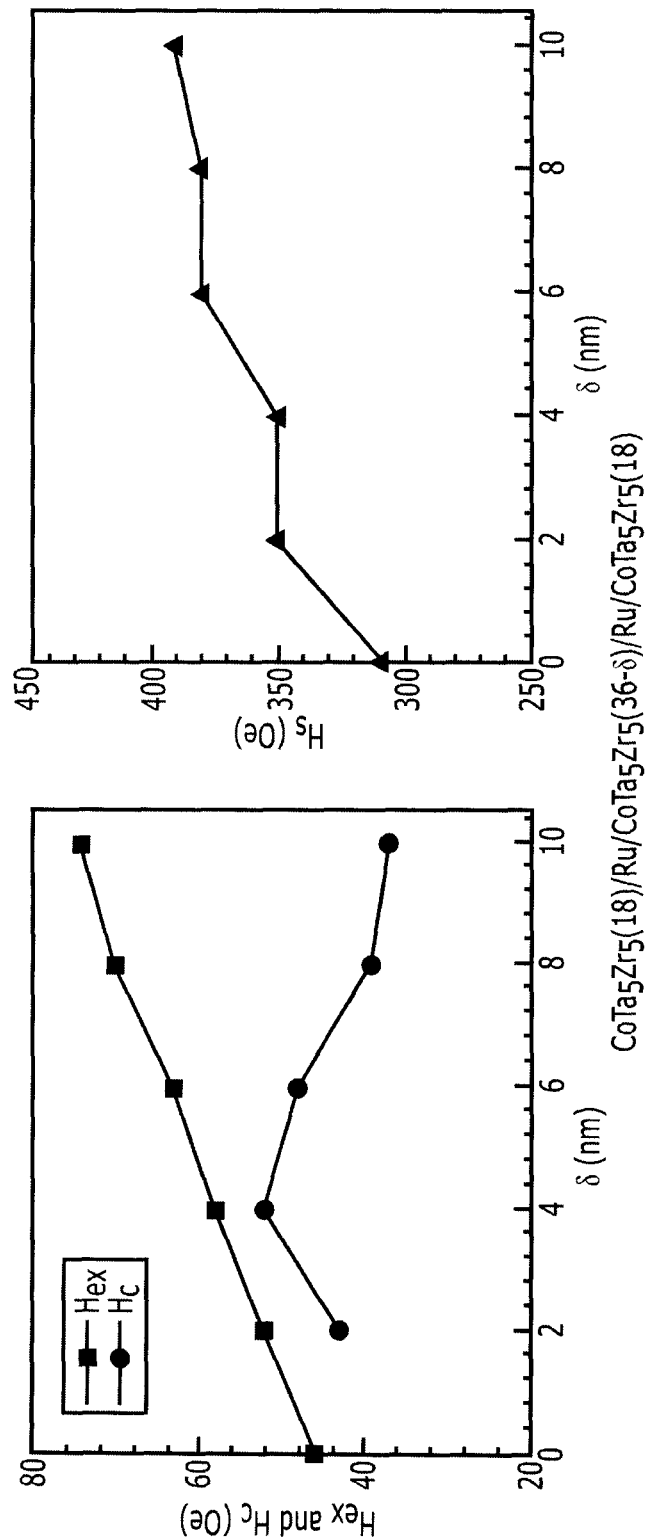
FIG. 8 is an illustration of the effect of varying the difference, δ, in thickness of the second ferromagnetic layer and the sum of the first and third ferromagnetic layers in the laminated SUL structure of the first embodiment of the present invention.

With reference now to FIG. 8 using one SUL material of $CoTa_5Zr_5$, the effect of varying the difference, δ, in the structure of $CoTa_5Zr_5(18)/Ru(0.8)/CoTa_5Zr_5(36-)/Ru(0.8)/CoTa_5Zr_5(18)$, where the numbers in parenthesis represent the layer thicknesses, in nm, of the first embodiment described above is demonstrated. As can be seen, while values of $H_{ex}$ and $H_s$ show increasing trends with increasing δ, coercivity increases up to 52 Oe at δ=4 nm, then tends to decrease as δ increases further. Even so, at a relatively large δ of 10 nm coercivity is still above approximately 37 Oe. The enhancement of magnetostatic exchange coupling caused by produces a self biasing effect in the middle $CoTa_5Zr_5$ layer, resulting in a high coercivity. This result demonstrates an improved permeability and robustness in terms of stray fields as compared to prior media structures.

Figure 9:
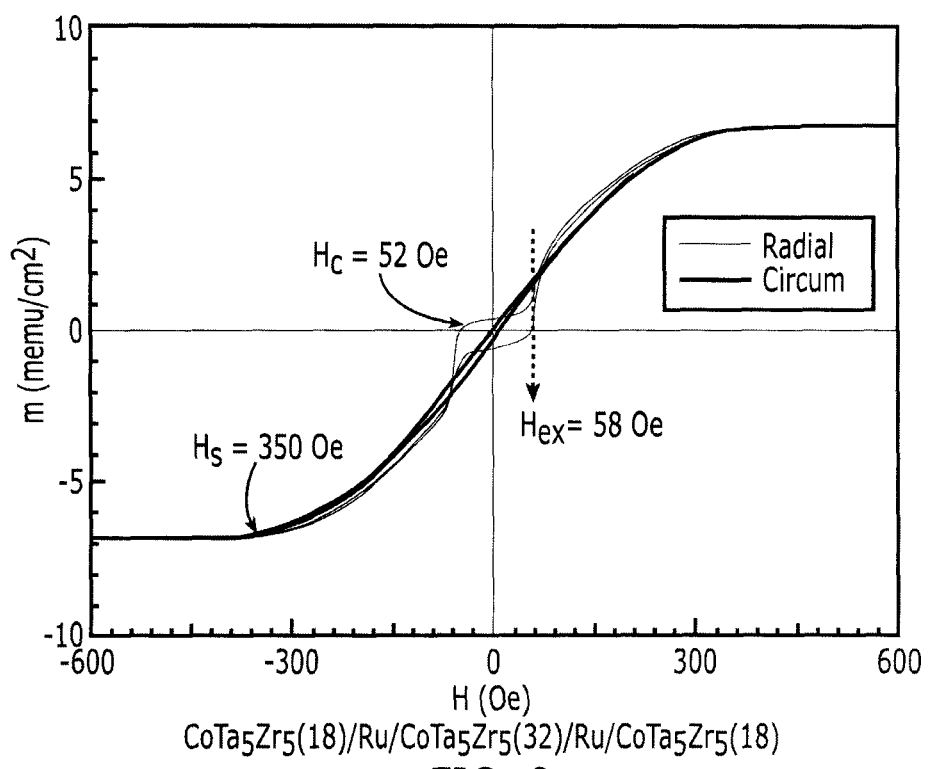
FIG. 9 is hysteresis loops in the laminated SUL structure of the first embodiment of the present invention with δ=4 nm.

FIG. 9 is a unique hysteresis loop for the tri-layer laminated SUL structure with δ=4 nm. That is, the SUL lamination is composed of $CoTa_5Zr_5(18)/Ru(0.8)/CoTa_5Zr_5(32)/Ru(0.8)/CoTa_5Zr_5(18)$, where the numbers in parenthesis represent the layer thicknesses, in nm. We believe that this is a particularly optimized structure for a number of reasons. First, the medium exhibits a high coercivity of over 50 Oe at δ6=4 nm, providing robustness of in-plane stray fields. Second, even though amorphous $CoTa_5Zr_5$ with excellent corrosion resistance is used, values of $H_{ex}$ and $H_s$ are 58 and 350 Oe, respectively. Third, these high exchange coupling strengths are sufficient to provide low permeability less than 50, resulting in excellent ATE performance. Fourth, the medium provides a single magnetic domain after radial magnetic field reset, reducing media noise. And the medium is within the boundaries of reasonable manufacturing costs and processes.

According to a third embodiment of the present invention, Fe is introduced to the CoTaZr composition of one or more of the ferromagnetic layers of the aforementioned tri-layer SUL. While there are a great many variations of layer compositions contemplated by this embodiment, one specific example is $CoTa_5Zr_5(Ms_1t_1)/Ru/CoFe_{28}Ta_3Zr_5(Ms_2t_2)/Ru/CoFe_{28}Ta_3Zr_5(Ms_3t_3)$, where $Ms_2=Ms_3$. Addition of Fe into CoTaZr increases both saturation flux density and exchange coupling strengths. $CoFe_{28}Ta_3Zr_5$ exhibits 4 $Ms_2\sim16$ kG ($Ms_2=Ms_3=1273$ emu/cm$^3$) while $CoTa_5Zr_5$ shows 4 $Ms_1\sim13$ kG ($Ms_1=1035$ emu/cm$^3$). Use of high saturation flux density soft magnetic materials can reduce total SUL thickness for matching the required value of Mst. However, it is well known that the addition of Fe deteriorates corrosion resistance, limiting Fe content in CoTaZr. Each layer may be a high saturation flux density alloy such as $CoFe_{28}Ta_3Zr_5$, but amorphous CoTaZr is preferable because of strong corrosion resistance. If an adhesion layer between a NiP-plated layer and the bottom ferromagnetic layer is used for further improving corrosion resistance, high saturation flux density alloy can be used as the first ferromagnetic layer.

Figure 10:
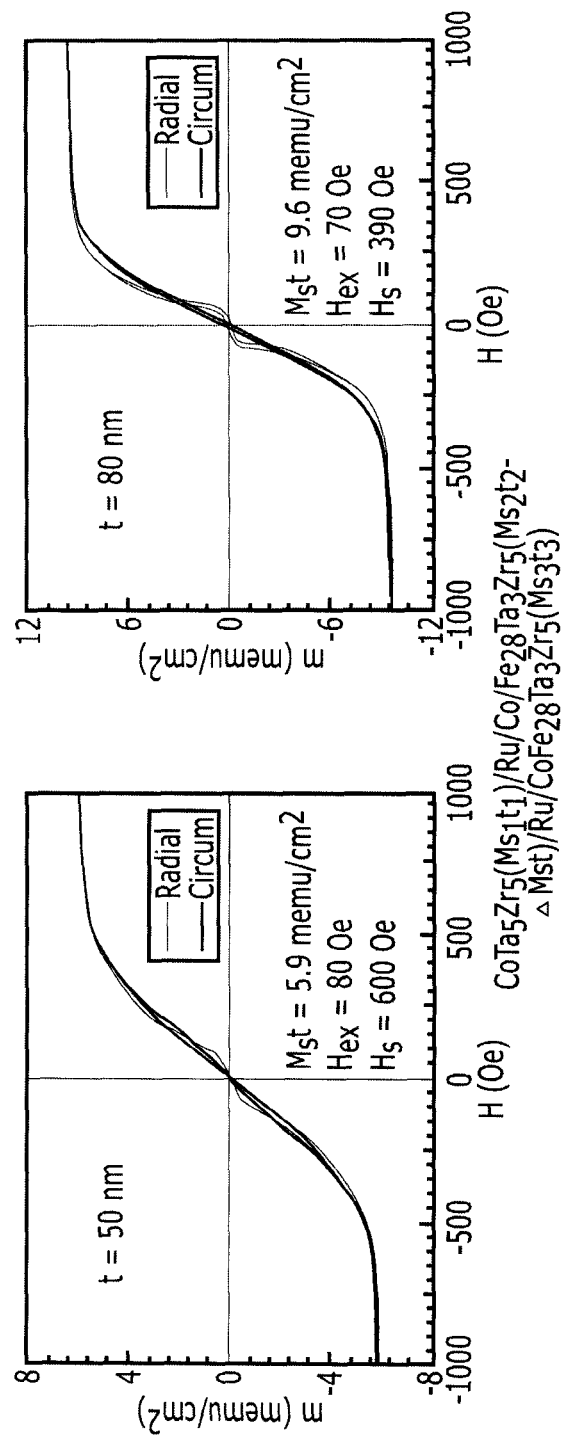
FIG. 10 shows hysteresis loops for media with t=50 and 80 nm according to the first embodiment of the present invention.
Figure 11:
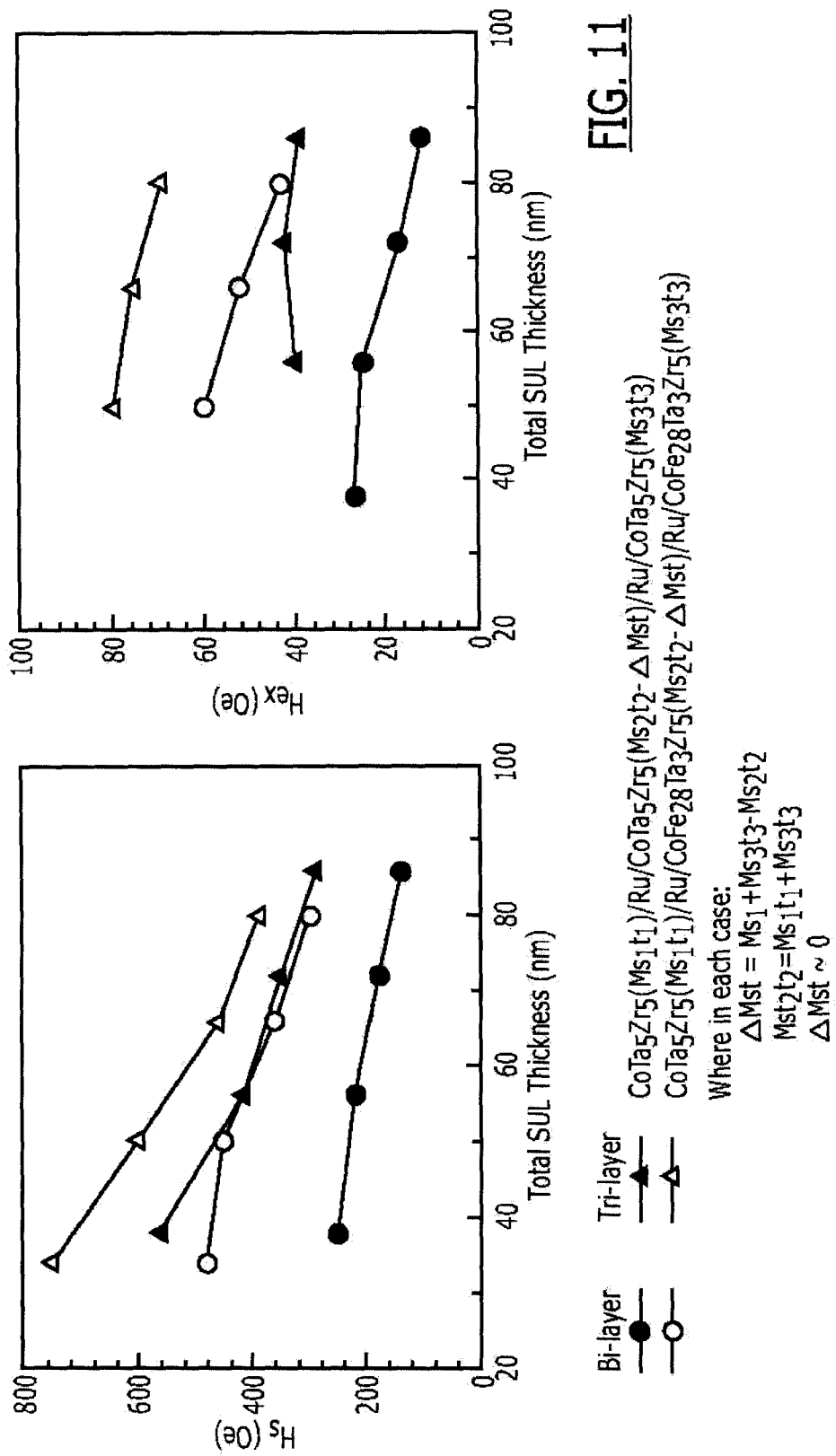
FIG. 11 is a summary of the effect of two different SUL materials of $CoTa_5Zr_5$ and $CoFe_{28}Ta_3Zr_5$ on saturation field and exchange bias field strength as a function of ferromagnetic layer thickness, t, in a tri-layer SUL lamination according to the present invention.

With reference next to FIG. 10, the effect of varying the total SUL thickness on $H_s$ and $H_{ex}$ in a tri-layer SUL lamination of $CoTa_5Zr_5(Mst_1)/Ru/CoFe_{28}Ta_3Zr_5(Ms_2t_2-\Delta Mst)/Ru/CoFe_{28}Ta_3Zr_5(Ms_3t_3)$ is examined. Where, $CoTa_5Zr_5$ has $Ms_1=1035$ emu/cm$^3$ and $CoFe_{28}Ta_3Zr_5$ has $Ms_2=Ms_3=1273$ emu/cm$^3$. Values of $t_1$, $t_2$, and $t_3$ are thicknesses of the first, second, and third ferromagnetic layer thickness, respectively. The Ru layer has a thickness of approximately 8 Å. This tri-layer SUL has $\Delta Mst\sim0$ between the first and third ferromagnetic layers and the second ferromagnetic layer, indicating an almost balanced tri-layer SUL. As can be seen from FIG. 11, SAP exchange coupling, both $H_s$ and $H_{ex}$ increases with decreasing total SUL thickness from 86 to 34 nm. The tri-layer SUL clearly provides higher SAP exchange coupling than a bi-layer SUL because of contribution of dual Ru spacer layers. Replacement of CoTaZr with $CoFe_{28}Ta_3Zr_5$ also additionally increase SAP exchange coupling. FIG. 11 demonstrates that the of $CoTa_5Zr_5$-based tri-layer SUL structure of the present invention can achieve SAP exchange coupling comparable with bi-layer SUL of $CoTa_5Zr_5/Ru/CoFe_{28}Ta_3Zr_5$. The structure according to the present invention has more room for high saturation flux density materials to improve corrosion resistance by adding non-magnetic elements of Cr, Ta, Zr, etc.

While a plurality of preferred exemplary embodiments have been presented in the foregoing detailed description, it should be understood that a vast number of variations exist, and these preferred exemplary embodiments are merely representative examples, and are not intended to limit the scope, applicability or configuration of the invention in any way. Rather, the foregoing detailed description provides those of ordinary skill in the art with a convenient guide for implementation of the invention, by way of examples, and contemplates that various changes in the functions and arrangements of the described embodiments may be made without departing from the spirit and scope of the invention defined by the claims thereto.

What is claimed is:

1. A method of producing a magnetic recording medium with a single domain soft magnetic underlayer, comprising:
    depositing a first soft ferromagnetic layer above a substrate;
    depositing a first spacer layer above said first soft ferromagnetic layer;
    depositing a second soft ferromagnetic layer above said first spacer layer;
    depositing a second spacer layer above said second soft ferromagnetic layer;
    depositing a third soft ferromagnetic layer above said second spacer layer, wherein a material of one of the first soft ferromagnetic layer, the second soft ferromagnetic layer, and the third soft ferromagnetic layer is different from a material of another of the first soft ferromagnetic layer, the second soft ferromagnetic layer, and the third soft ferromagnetic layer;
    whereby the product of saturation magnetization (Ms) and thickness (t), Mst, of the second soft ferromagnetic layer is less than the sum of the Mst of the first soft ferromagnetic layer and the Mst of the third soft ferromagnetic layer; and
    performing a radial field reset such that said first soft ferromagnetic layer assumes a first remanent radial magnetic orientation, said second soft ferromagnetic layer assumes a second remanent radial magnetic orientation anti-parallel to said first remanent radial magnetic orientation, and said third soft ferromagnetic layer assumes said first remanent radial magnetic orientation.

2. The method of claim 1, wherein said radial field reset is performed by exposure of the soft ferromagnetic layers to a radial magnetic field of strength at least equal to the switching field of the soft magnetic underlayer along the radial direction of the substrate.

3. The method of claim 1, wherein said radial field reset is performed by exposure of the soft ferromagnetic layers to a radial magnetic field strength that is greater than the saturation field strength of the soft magnetic underlayer along the circuital direction of said substrate.

4. The method of claim 1, wherein the sum of the Mst of each of said first, second and third soft ferromagnetic layers is equal to or greater than 2.0 memu/cm2 and less than 12.5 memu/cm2.

5. The method of claim 1, wherein the Mst of said second soft ferromagnetic layer is 75%-99% of the sum of the Mst of said first soft ferromagnetic layer and the Mst of said third soft ferromagnetic layer.

6. The method of claim 1, wherein each of said second and third soft ferromagnetic layers include cobalt, and at least one other element selected from the group consisting of: iron, nickel, manganese, palladium, tantalum, niobium, zirconium, hafnium, chromium, titanium, molybdenum, vanadium, tungsten, aluminum, silicon, boron, nitrogen, and oxygen.

7. The method of claim 1, wherein the performing the radial field reset such that said first soft ferromagnetic layer assumes the first remanent radial magnetic orientation, said second soft ferromagnetic layer assumes the second remanent radial magnetic orientation anti-parallel to said first remanent radial magnetic orientation, and said third soft ferromagnetic layer assumes said first remanent radial magnetic orientation comprises:

depositing a nucleation layer above the third soft ferromagnetic layer;

depositing a magnetic recording layer above said nucleation layer; and performing the radial field reset such that said first soft ferromagnetic layer assumes the first remanent radial magnetic orientation, said second soft ferromagnetic layer assumes the second remanent radial magnetic orientation anti-parallel to said first remanent radial magnetic orientation, and said third soft ferromagnetic layer assumes said first remanent radial magnetic orientation.

8. The method of claim 1:

wherein the thickness of the first soft ferromagnetic layer is equal to the thickness of the third soft ferromagnetic layer; and wherein the thickness of the second soft ferromagnetic layer is 75%-99% of twice the thickness of the first soft ferromagnetic layer.

9. The method of claim 1, wherein the first soft ferromagnetic layer, the first spacer layer, the second soft ferromagnetic layer, the second spacer layer, and the third soft ferromagnetic layer provide the single domain soft magnetic underlayer.

* * * * *